United States Patent
Chen et al.

(10) Patent No.: US 6,916,208 B2
(45) Date of Patent: Jul. 12, 2005

(54) MEMORY CARD READER FOR ELECTRONIC DEVICES

(75) Inventors: Chien-An Chen, Hsinchu Hsien (TW); Yu-Fong Lin, Hsinchu Hsien (TW)

(73) Assignee: Phison Electronics Corp., Hsinchu Hsien (TW)

( * ) Notice: Subject to any disclaimer, the term of this patent is extended or adjusted under 35 U.S.C. 154(b) by 0 days.

(21) Appl. No.: 10/721,279

(22) Filed: Nov. 26, 2003

(65) Prior Publication Data

US 2005/0112951 A1 May 26, 2005

(51) Int. Cl.[7] .............. H01R 25/00; H01R 27/02; H01R 31/00; H01R 33/88; H01R 33/92; H01R 33/94; G06K 7/00
(52) U.S. Cl. .............. 439/639; 439/638; 235/439
(58) Field of Search ............... 439/639, 638, 439/640, 626, 632; 235/439

(56) References Cited

U.S. PATENT DOCUMENTS

| | | | | |
|---|---|---|---|---|
| 6,102,284 A | * | 8/2000 | Myers et al. | 235/375 |
| 6,486,862 B1 | * | 11/2002 | Jacobsen et al. | 345/88 |
| 6,796,500 B1 | * | 9/2004 | Chen | 235/439 |
| 2001/0000777 A1 | * | 5/2001 | McGregor et al. | 455/406 |
| 2001/0034803 A1 | * | 10/2001 | Sorek et al. | 710/129 |
| 2001/0055978 A1 | * | 12/2001 | Herrod et al. | 455/517 |
| 2004/0116155 A1 | * | 6/2004 | Aisenberg | 455/558 |

* cited by examiner

*Primary Examiner*—Chandrika Prasad

(57) ABSTRACT

A compact card reader is described. The compact card reader has a charging circuit and a cellular phone-connecting slot to enable the compact card reader to save/retrieve data to/from a memory card or a cellular phone, at the same time charge the cellular phone and the cellular phone battery in order to reduce the operation cost and this also increases the speed of the data processing.

6 Claims, 4 Drawing Sheets

MEMORY CARD READER FOR ELECTRONIC DEVICES

BACKGROUND OF THE INVENTION

1. The Field of the Invention

The present invention relates to a chargeable compact card reader, and more particularly to a chargeable compact card reader using a charging circuit and a control chip installed therein to save/retrieve data, and charge battery to/from the cellular phone and the battery and memory card thereof for reducing the usage cost and reduce the processing time.

2. Description of the Related Art

In the digital technologies era, the mobile phone has been improved from an analogue mobile phone system (AMPS) to the group special mobile (GSM), and now the cellular phone can even link to the internet allowing the user to surf on the net at anytime. Nowadays, the cellular phones can be equipped with a digital camera or a digital video camera, and may also be equipped with game and MP3 functionalities. The latest cellular phone is also capable of data transmission to the computer providing substantial convenience to the users.

In spite of above enjoyment and convenience, the cellular phone still has certain defects, such as insufficient built-in memory, requiring a user to use an external memory card to expand the memory. Therefore, the user needs to have a card reader, a charger and a data transmission cable for making use of the most of resources of the cellular phone. However, there are several types of memory cards available on the market, and most of them are require USB to connect with the computer. Besides, there is no charger in the card reader for the cellular phone and the battery. If the charging of the battery and transmitting of the data need to be processed separately, this will certainly cause inconvenience and thereby increases the cost. Therefore, how to resolve the above defects has become the important issue for the manufacturer in the field.

SUMMARY OF THE INVENTION

Accordingly, in the view of the foregoing, the present inventor makes a detailed study of related art to evaluate and consider, and uses years of accumulated experience in this field, and through several experiments, to create a new chargeable compact card reader. The present invention provides an innovated, cost effective chargeable compact card reader.

According to an aspect of the present invention, the compact card reader comprises a charging circuit and a cellular phone-connecting slot to enable the compact card reader to save/retrieve data to/from a memory card or a cellular phone, at the same time charge the cellular phone and the cellular phone battery in order to reduce the operation cost and this also increases the speed of the data processing.

BRIEF DESCRIPTION OF THE DRAWING

For a more complete understanding of the present invention, reference will now be made to the following detailed description of preferred embodiments taken in conjunction with the accompanying drawings.

DETAILED DESCRIPTION OF PREFERRED EMBODIMENTS

Figure 1:
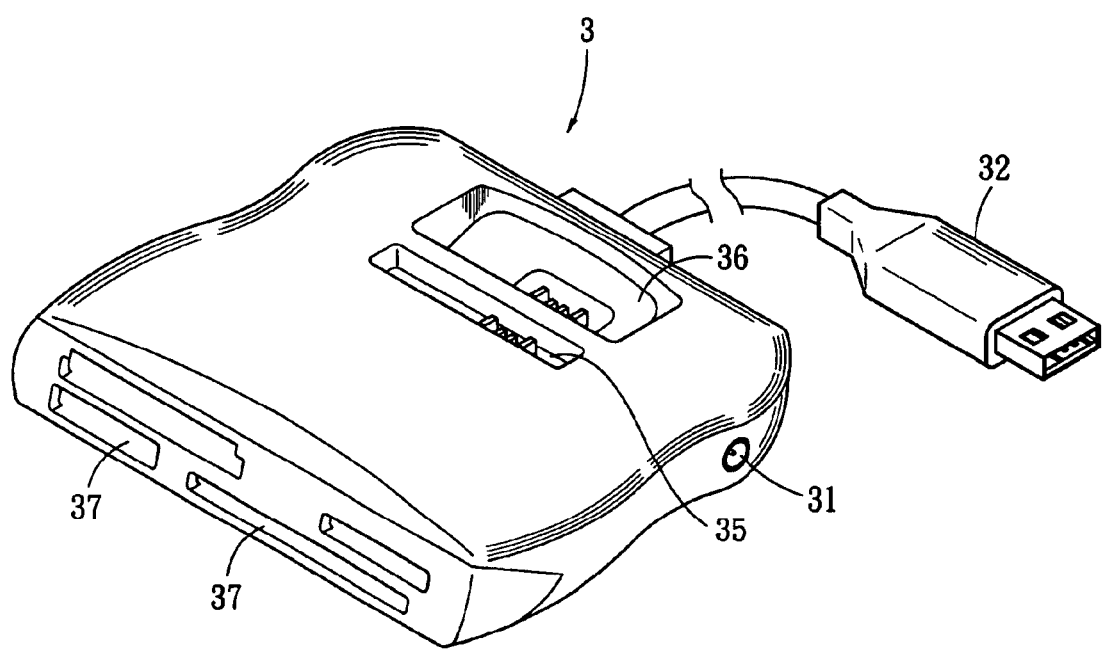
FIG. 1 is an elevational view of a chargeable compact card reader according to a preferred embodiment of the present invention.

Reference will be made in detail to the preferred embodiments of the invention, examples of which are illustrated in the accompanying drawings. Wherever possible, the same reference numbers are used in the drawings and the description to refer to the same or like parts.

Figure 2:
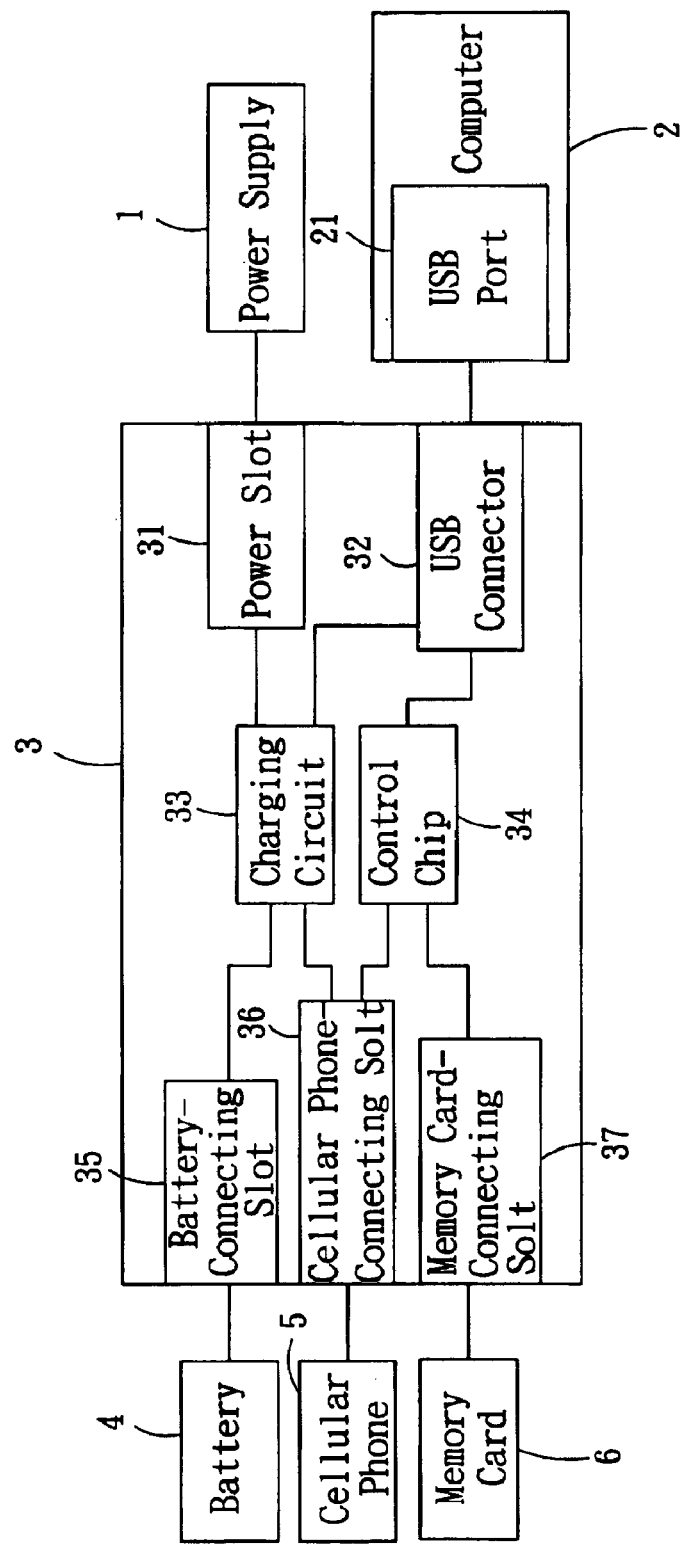
FIG. 2 is a connection block diagram of the chargeable compact card reader according to a preferred embodiment of the present invention.

Referring to FIGS. 1 and 2, an elevational view and a connection block diagram of a chargeable compact card reader according to a preferred embodiment of the present invention are respectively shown. As shown in the above-mentioned figures, the compact card reader 3 comprises a power slot 31, a USB connector 32, a charging circuit 33, a control chip 34, a battery-connecting slot 35, a cellular phone-connecting slot 36 and one or plural memory card-connecting slot 37.

The above power slot 31 is installed above the case of the compact card reader 3 and can connect to an external power supply 1.

The USB connector 32 is installed at a rear side of the compact card reader 3 and can connect to a USB port 21 of a computer 2.

The charging circuit 33 is set within the compact card reader 3 and is connected to the power slot 31 and the USB connector 32.

The control chip 34 is set within the compact card reader 3 and is connected to the USB connector 32.

The battery-connecting slot 35 is installed on a topside of the compact card reader 3 and is connected to the charging circuit 33, for receiving a cellular phone battery 4.

The cellular phone-connecting slot 36 is installed on a topside of the compact card reader 3 and is connected to the charging circuit 33 and the control chip 34, for receiving a cellular phone 5.

The memory card-connecting slot 37 is installed on the frontal side of the compact card reader 3 and is connected to the control chip 34, for receiving a memory card 6.

After assembling the above elements, when the battery 4, the cellular phone 5 and the memory card 6 are respectively connected to the battery-connecting slot 35, the cellular phone-connecting slot 36 and memory card-connecting slot 37 set on the compact card reader 3, and the USB connecter 32 is connected to the USB port 21 of the computer 2, the charging circuit 33 can charge to the battery 4 and cellular phone 5 with the power received through the USB connector 32 and USB port 21. The cellular phone 5 and memory card 6 that are respectively connected to the cellular phone-connecting slot 36 and memory card-connecting slot 37 are used for processing saving or retrieving of data to or from the computer 2 through the control chip 34, the USB connector 32 and USB port 21. Thus, the process of data saving or retrieving to or from the memory card 6 or the cellular phone 5, and the charging of the cellular phone 5 and the battery 4 can be achieved at the same time.

If there is no data saving or retrieving being processed, the user can directly use the power slot 31 to connect to the external power supply 1 so that the battery 4 and cellular phone 5 connected to the battery-connecting slot 35 and the cellular phone-connecting slot 36 can be charged with power through the charging circuit 33.

Figure 3:
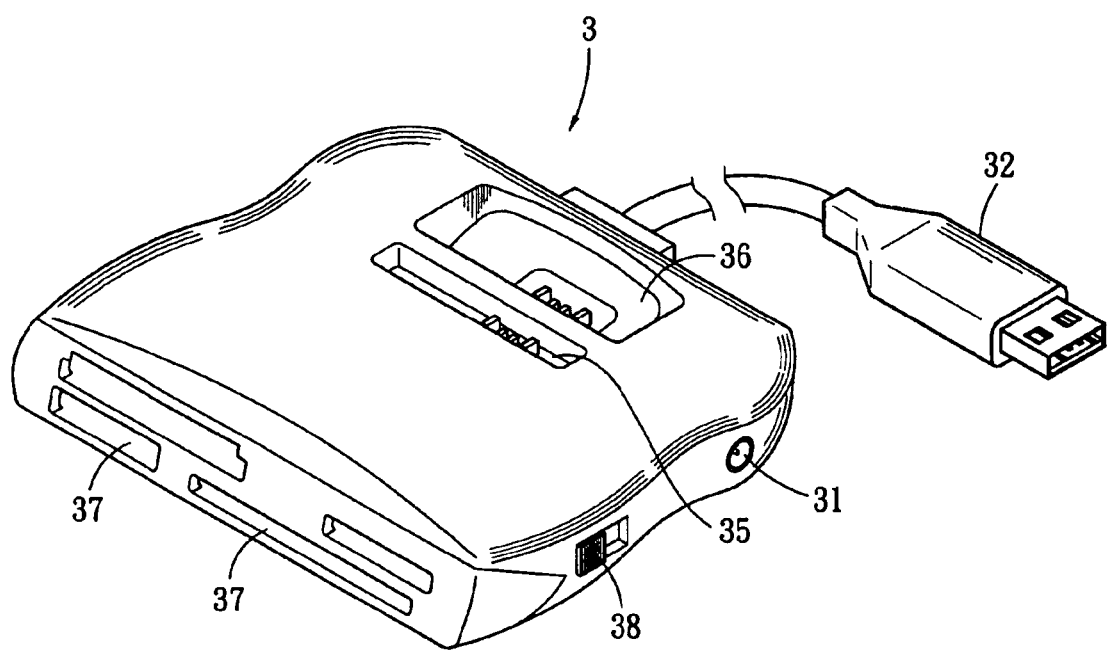
FIG. 3 is an elevational view of a chargeable compact card reader according to another preferred embodiment of the present invention.
Figure 4:
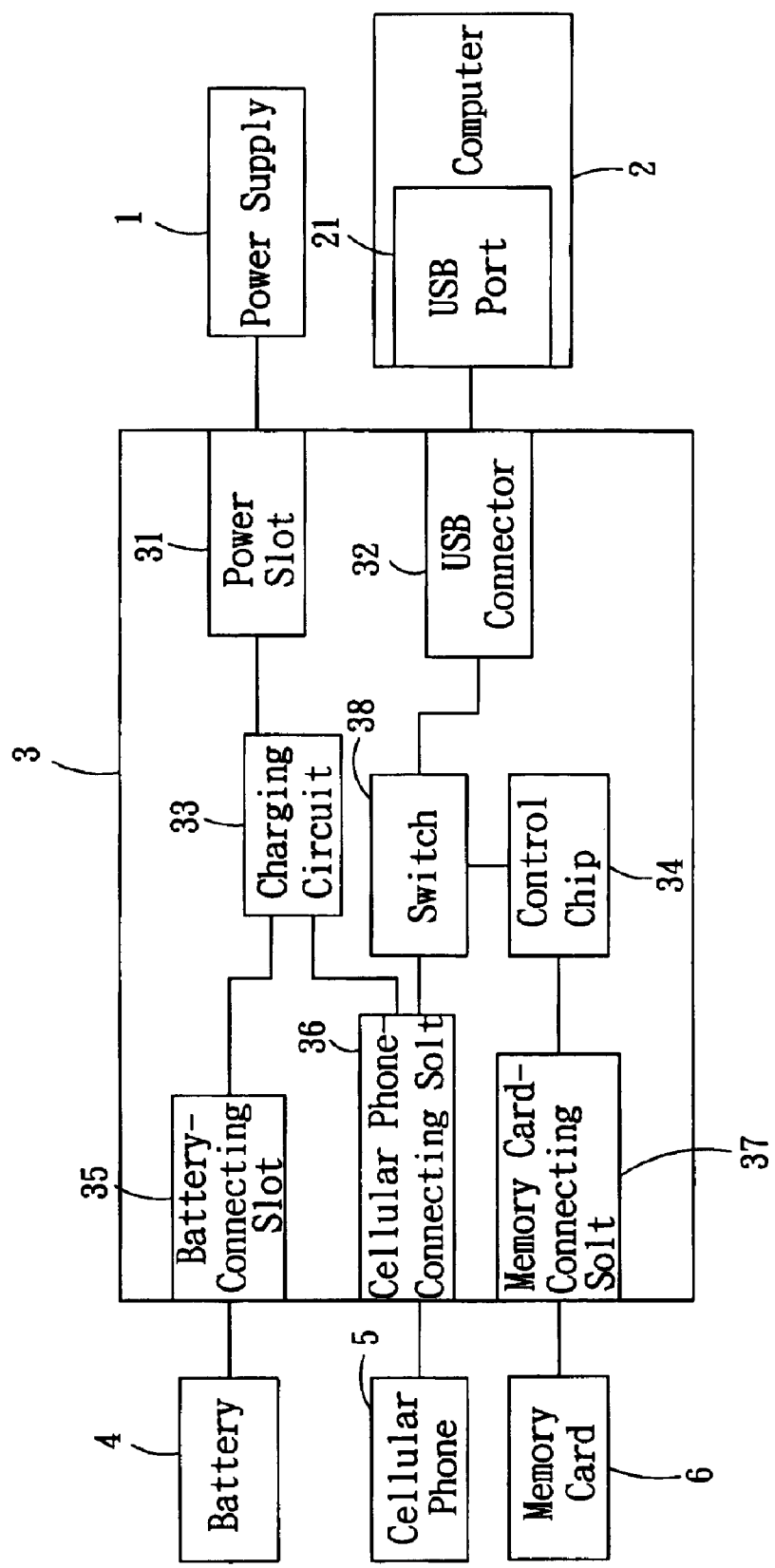
FIG. 4 is a connection block diagram of the chargeable compact card reader according to another preferred embodiment of the present invention.

Now referring to FIGS. 3 and 4, an elevational view and a connection block diagram of the chargeable compact card reader according to another preferred embodiment of the present invention are shown respectively. As shown, the structure of the compact card reader 3 is similar to that shown in FIGS. 1 and 2, except that on the case of the compact card reader 3 has a switch 38 connected between the control chip 34 and USB connector 32, allowing the user to choose whether to process data transmission to or from the cellular phone 5 or the memory card 6 using the cellular phone-connecting slot 36 or the memory card-connecting slot 37.

Additionally, the above memory card-connecting slot 37 can be configured with a multi-functional memory card-connecting slot for receiving a variety of memory cards in order to provide minimize space occupation of the chargeable compact card reader of the present invention.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A memory card reader, comprising:

a USB connector, for connecting to a USB port of a computer;

a charging circuit, connected to said USB connector, wherein said charging circuit receives power from a power supply;

a control chip, connected to said USB connector;

a cellular phone-connecting slot, connected to said charging circuit and said control chip, for connecting to a cellular phone, wherein said cellular phone is charged with power using the power supplied by said charging circuit, and wherein data stored in said cellular phone is transmitted to said computer through said control chip and said USB connector; and a memory card-connecting slot, connected to said control chip, for receiving a memory card, wherein through said control chip and USB connector, said memory card-connecting slot can process data saving or retrieving to or from said computer, the data saving or retrieving step to or from said memory card, or to from said cellular phone, and charging of said cellular phone, are performed simultaneously, so that the overall operation speed is substantially increased.

2. The memory card reader according to claim 1, wherein said card reader further comprises a power slot for connecting to said charging circuit, so that when a user need not process data saving or retrieving step, the user can directly connect an external power supply to said power slot to charge said cellular phone.

3. The memory card reader according to claim 1, wherein said card reader comprises a battery-connecting slot for connecting to said charging circuit, so that a battery is inserted into said battery-connecting slot.

4. The memory card reader according to claim 1, wherein said memory card-connecting slot is configured for inserting at least one type of memory cards.

5. The memory card reader according to claim 1, wherein said memory card-connecting slot is configured with a multi-functional memory card-connecting slot adapted for receiving a variety of memory cards.

6. The memory card reader according to claim 1, wherein said card reader further comprises a switch between the control chip and the USB connector for selecting whether to process data saving or retrieving to or from said cellular phone, or said memory card.

* * * * *